United States Patent
Carr et al.

(10) Patent No.: US 10,445,816 B2
(45) Date of Patent: Oct. 15, 2019

(54) SYSTEM, METHOD, AND NON-TRANSITORY COMPUTER-READABLE STORAGE MEDIA FOR ALLOWING A CUSTOMER TO PLACE ORDERS REMOTELY AND FOR THE ORDER ASSEMBLER TO COMMUNICATE DIRECTLY WITH THE CUSTOMER

(71) Applicant: Wal-Mart Stores, Inc., Bentonville, AR (US)

(72) Inventors: David Jon Carr, Mountain View, CA (US); Richard Mark Ramsden, Foster City, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 613 days.

(21) Appl. No.: 14/549,277

(22) Filed: Nov. 20, 2014

(65) Prior Publication Data

US 2016/0148302 A1    May 26, 2016

(51) Int. Cl.
*G06Q 30/00* (2012.01)
*G06Q 30/06* (2012.01)
*G06Q 10/08* (2012.01)
*G06Q 10/06* (2012.01)

(52) U.S. Cl.
CPC ......... *G06Q 30/0635* (2013.01); *G06Q 10/06* (2013.01); *G06Q 10/08* (2013.01); *G06Q 30/00* (2013.01)

(58) Field of Classification Search
CPC .................................................. G06Q 10/08
See application file for complete search history.

(56) References Cited

U.S. PATENT DOCUMENTS

| | | | | |
|---|---|---|---|---|
| 7,233,914 | B1 * | 6/2007 | Wijaya | G06Q 10/087 705/26.1 |
| 8,660,903 | B1 * | 2/2014 | Croak | G06Q 30/0641 705/26.1 |
| 9,202,246 | B1 * | 12/2015 | Bundy | G06Q 30/0635 |
| 2004/0068443 | A1 * | 4/2004 | Hopson | G06Q 10/02 705/5 |
| 2013/0204719 | A1 * | 8/2013 | Burry | G06Q 50/12 705/15 |

OTHER PUBLICATIONS

Beyond the checkout cart: Here's why mobile phones, social networks, and instore tracking are blurring the difference between online and offline retail. (2014). MIT Technology Review, 117(1), 61(8). Retrieved from https://dialog.proquest.com/professional/docview/1491934930?accountid=142257 (Year: 2014).*

* cited by examiner

*Primary Examiner* — Michael Misiaszek
*Assistant Examiner* — Jason B Warren
(74) *Attorney, Agent, or Firm* — Bryan Cave Leighton Paisner LLP

(57) ABSTRACT

Techniques for allowing a customer to order goods on-line or remotely and to pick-up the goods at a desired location or store are disclosed. The techniques include receiving a customer order. The customer order includes at least one good. The techniques further include establishing a list of alternative goods if one or more of the goods in the customer order are unavailable and allowing the customer to choose one of the alternative goods as a substitute good and establishing a revised customer order.

27 Claims, 10 Drawing Sheets

68

PLEASE ENTER PICKUP TIME:

○ TODAY
○ MM/DD/YY     03:30 AM

< BACK     CANCEL     NEXT >

ORDER BASKET:

BREAD
MOUNTAIN DAIRY MILK
VALUE CORN FLAKES
SRUBBING PADS
FLOOR CLEANER
ORANGES
SALAD MIX
CELL PHONE CHARGER
MICRO SD MEMORY CARD

< BACK     CANCEL     NEXT >

FIG. 10

SYSTEM, METHOD, AND NON-TRANSITORY COMPUTER-READABLE STORAGE MEDIA FOR ALLOWING A CUSTOMER TO PLACE ORDERS REMOTELY AND FOR THE ORDER ASSEMBLER TO COMMUNICATE DIRECTLY WITH THE CUSTOMER

FIELD OF THE DISCLOSURE

The present invention relates to the remote ordering of goods or items by a customer that are to be assembled at a store or facility, and more particularly, to systems, methods, and computer-readable storage media that facilitate the establishment of a list of alternative goods if one of the goods in the customer order are unavailable.

BACKGROUND

Many customers desire to order items or goods remotely, e.g., on-line, through the Internet, or using a specially designed application or app on a mobile device, such as a tablet or cell phone. The customer may desire that the goods in the order be delivered to their home or that the goods in the order be assembled and ready for the customer to pick-up at a specific location, e.g., a particular store, typically at a specific time.

However, in some instances a particular good or goods may not be available to be included in the customer order when assembled to meet the customer's desired delivery or pick-up time. In current systems, the employee assembling the order is allowed to pick a substitute good to be included in the customer's order. However the good or goods chosen by the employee may not meet the customer's needs. For example, the customer may dislike or may be allergic to an ingredient in the chosen substitute good.

The present invention is aimed at one or more of the problems identified above.

SUMMARY OF THE INVENTION

In different embodiments of the present invention, systems, methods, and computer-readable storage media allow orders to be received and assembled at a store, and the situation that one or more of the goods in an order are unavailable, provide for an alternative good or goods to be selected and included in the order.

In one embodiment, a system includes an order fulfillment system and an assembler device. The order fulfillment system is associated with a facility and is configured to receive a customer order placed by a customer. The customer order includes at least one good. The order fulfillment system assists an assembler in assembling the customer order for the customer. The assembler device is coupled to the order fulfillment system and is operable by the assembler. The assembler device is configured to allow the assembler to view a list of the at least one good in the customer order, and if one of the at least one good is not available at the facility, to allow the assembler to establish a list of substitute goods.

In another embodiment, the system may also include a database and an order server. The database is configured to store information related to customer orders. The order server may be coupled to the database and the order fulfillment system. The order server may be configured to allow the customer to place the customer order through a customer device coupled to the order server. The order server may be further configured to store the customer order in the database.

In still another embodiment, the order server may be further configured to communicate the list of substitute goods to the customer, and to allow the customer to choose one of the substitute goods as an alternative good. The order fulfillment server may be further configured to, if after a predetermined time the customer does not respond with a chosen one of the substitute goods, allow the assembler, using the assembler device, to choose an alternative good from the list of substitute goods, and to establish a revised customer order including the alternative good.

In other embodiments, a method includes the step of receiving a customer order at an order fulfillment system associated with a facility and responsively assisting an assembler in assembling the customer order for the customer. The customer order includes at least one good. The method further includes the steps of allowing the assembler, using an assembler device coupled to the order fulfillment system, to view a list of the at least one good in the order and if one of the at least one good is not available at the facility, allowing the assembler to establish, using the assembler device, a list of substitute goods.

In another embodiment, the method may further include the steps of storing information related to customer orders in a database and allowing the customer to place the customer order through a customer device coupled to an order server.

In still another embodiment, the method may further include the steps of communicating, by the order server, the list of substitute goods to the customer, and allowing the customer to choose one of the substitute goods as an alternative good using the customer device. The method may also include the steps of, if after a predetermined time the customer does not respond with a chosen one of the substitute goods, requiring the assembler to choose an alternative good from the list of substitute goods and establishing a revised customer order including the alternative good and storing the revised customer order in the database.

In still other embodiments, one or more non-transitory computer-readable storage media, have computer-executable instructions embodied thereon. When executed by at least one processor, the computer-executable instructions cause the at least one processor to receive a customer order at an order fulfillment system located at a facility. The customer order includes at least one good. The computer-executable instructions further cause the processor to allow the assembler, using an assembler device coupled to the order fulfillment system, to access the database and view a list of the at least one good in the order and, if one of the at least one good is not available at the facility, allow the assembler, using the assembler device, to establish a list of substitute goods.

In a further embodiment, the computer-executable instructions may further cause the processor to allow a customer to place the customer order through a customer device coupled to an order server and to store the customer order in the database.

In a still further embodiment, the computer-executable instructions may further cause the processor to communicate, by the order server, the list of substitute goods to the customer, allow the customer to choose one of the substitute goods as an alternative good using the customer device, and if after a predetermined time the customer does not respond with a chosen one of the substitute goods, require the assembler to choose an alternative good from the list of substitute goods and establish a revised customer order including the alternative good and store the revised customer order in the database.

BRIEF DESCRIPTION OF THE FIGURES

Other advantages of the present disclosure will be readily appreciated, as the same becomes better understood by reference to the following detailed description when considered in connection with the accompanying drawings wherein:

Non-limiting and non-exhaustive embodiments of the present invention are described with reference to the following figures, wherein like reference numerals refer to like parts throughout the various views unless otherwise specified.

FIG. 9 is an illustration of an exemplary screenshot from the system of FIG. 1, according to an embodiment of the present invention;

FIG. 10 is an illustration of an exemplary screenshot from the system of FIG. 1, according to an embodiment of the present invention;

Figure 1:
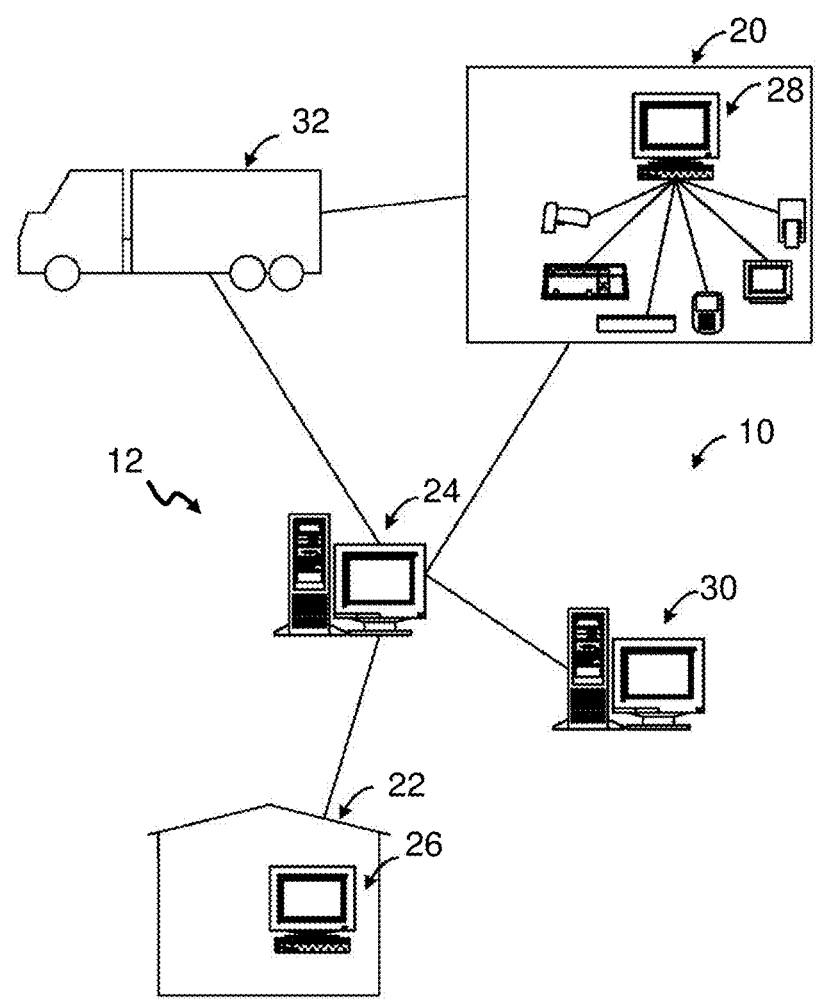
FIG. 1 is a schematic illustrating various aspects of a system according to the present disclosure.

Corresponding reference characters indicate corresponding components throughout the several views of the drawings Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis.

The disclosure particularly describes how a customer may order goods on-line or remotely and arrange to pick-up the order at a specified location, such as a store or to have the goods in the order delivered to the customer. Particularly, the present disclosure describes how a system associated with a store arranges an on-line or remotely placed order to be assembled and ready for pick-up or delivery and further to a method that establishes a list of substitute goods if one of the goods in the customer order are unavailable.

With reference to the FIGS. and in operation, the present invention, the present invention provides a system 10, methods and computer product media that facilitates the assembly of an order for a customer that the customer may desire to pick-up at a specification location, e.g., a store or to have delivered. In particular, the present invention allows an employee at the store or facility, i.e., an assembler, to establish a list of substitute goods if one of the goods in the customer order are unavailable Referring to FIG. 1, an exemplary environment in which the system 10 operates is illustrated. A customer may desire to purchase items from a facility at a specified location, such as a store 20. The store 20 may be representative of a larger corporate environment which may provide many avenues of interface with a customer. In a modern shopping environment, a store 20 may include both one or more brick and mortar retail locations and an on line retail location.

It should be noted that the store 20 may include, or be part of, a plurality of stores 20. The customer, as explained below, may be allowed to choose the store from the plurality of stores 20.

Generally, the customer may desire to order items from the store 20 and have the items (or goods) delivered to a customer location 22 such as the customer's residence, business, etc. . . . Alternatively, the customer may desire to pick-up the order from the store 20.

The system 10, in addition to facilitate the assembly of the order at the store, may be configured to allow or facilitate orders to be efficiently delivered to the customer location 22 and to allow orders to be delivered to the customer location 22 or to be picked up at a selected store 20. The customer may desire and request that the order be delivered or picked up the same day that the order is placed or a future day. Furthermore, the customer may request a delivery or pick-up time.

For clarity in discussing the various function of the system 10, multiple computers and/or servers are discussed as performing different functions in delivering goods to a customer. These different computers (or servers) may, however, be implemented in multiple different ways such as modules within a single computer, as nodes of a computer system, etc. . . . The functions or performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

The computer system 10 may include or have an associated first server or order server 24. The first server 24 may host a store webpage which allows a customer to, via a customer device 26, interact with the store 20 and first server 24 to place an order for one or more items or goods from the store 20. Alternatively, the first server 24 may communicate and interact directly with the customer device 26 via appropriate software applications or apps running on the first server 24 and the customer device 26.

The first server 24 may include a database of items which are for sale within the store 20 with information relevant to these items. The first server 24 may include software to allow delivery of items to a customer or to facilitate pick-up of the items from the store 20 by the customer. Particularly, the first server 24 may provide an internet webpage to allow a customer to select items, select or enter delivery or pick-up information, and purchase the items in a virtual shopping environment. The first server 24 may communicate with other computers, servers, or components of the system 10 to deliver the items to the customer or to arrange for pick-up of the items (see below).

The system 10 may also include a second server 28. The second server 28 may interact with the store 20 and assist the store employees in picking items for orders and assembling the order. The second server 28 and other hardware components that may be located at the store or facility may be referred to as an order fulfillment system 12.

The system 10 may also include a third server 30. The third server 30 may manage delivery routes for a delivery service 32 which delivers goods to a customer. The third server 30 may determine when, during a day, there is sufficient time to deliver an order to the customer and may provide information to the first server 24 to allow the store server to provide customized information to the customer during the ordering process to allow the customer to select a desired delivery window which may be fulfilled by the store 20 and delivery service 32.

A customer purchasing items from the store 20 for delivery to a customer location 22 or pick-up at a store 20 will typically view an internet webpage or access an application or app corresponding to the store. The customer may have an account with the store and may sign into the system 10. A customer account may include information about the customer such as name, address, past purchase history, etc. The webpage or app may display to the customer items at the store 20 which are available for pick-up or delivery. Not all items may be available for pick-up (at a specific or selected store) or for delivery. The customer may select items or goods for purchase. In signing into an account or entering information for a purchase, the first server 24 may receive (from the customer) customer information which facilitates delivery of goods to the customer. Particularly, the first server 24 may receive the address of the customer location 22 where purchased items are to be delivered. Alternatively, the first server 24 may receive a customer selection of a store 20 at which the customer desires to pick-up the order as well as a customer motor vehicle license plate number.

The first server 24 may provide customer information, such as the address of the customer location 22, to the third server 30. The third server 30 may use the customer information to determine time periods during the day when a delivery service 32 may deliver the items to the customer. The third server 30 may manage multiple delivery trucks/routes throughout the day for the delivery service 32 and may determine how much time a delivery truck has available and how much time is required to deliver the items to the customer location 22. The third server 30 may determine when during the day a delivery truck (or other delivery service) may deliver the items to the customer. The third server 30 may provide information regarding when the delivery service 32 is able to deliver items to the customer location 22 to the first server 24. One embodiment of the system 10 and the delivery of the orders to the customer location 22 using the delivery service 32 is described within commonly owned U.S. Patent Application Publication No. 2014/0095350, published Apr. 3, 2014, which is hereby incorporated by reference.

The first server 24 may then transmit information regarding the order to the store 20, and in particular to the second server 28. The second server 28 may be coupled to, or in communication with, include a computer system as well as one or more assembler devices to assist store employees in preparing customer orders for delivery. The assembler devices, which may be handheld devices (see below), may provide information to a store employee or assembler, may allow a store employee to scan items, and may allow the assembler(s) to print a sticker for those items. The store employee may collect items throughout the store 20 and arrange for those items to be assembled and ready for delivery to one or more customer locations or for pick-up at the store 20.

In one aspect of the invention, the assembler is an employee, i.e., a person, or employees, who utilize the handheld device(s) to assemble the customer order. In another aspect of the present invention, the assembler may be, at least in part, an automatic inventor retrieval system, or AIRS, that automatically retrieves the items from the facility. The AIRS may include one or more robots under control of a suitable controller that is able to read the items in the customer order, retrieve the items from the facility, and place the items in a designated location, such as in a designated bin, in order to facilitate assembly of the customer order. The specific nature, including number and type, of robots required will be dependent upon the layout of the facility, the manner in which the items or goods are stored, and the nature of the items or goods. In some embodiments, of the present invention the assembler devices may be integrated with the AIRS. For purposes of the discussion below, the terms "assembler", "assembler device" or "handheld device" include (1) an employee/person who utilizes an assembler or handheld device and/or (2) an automated inventory retrieval system (AIRS) with an integrated assembler device.

Figure 2:
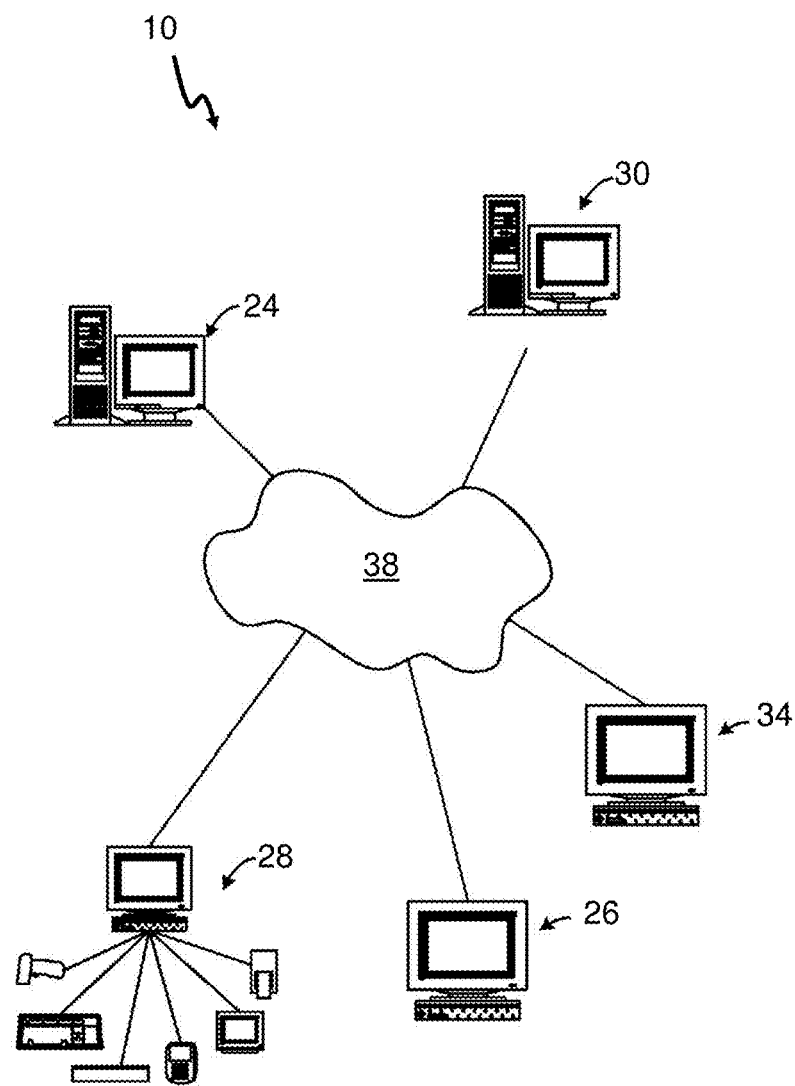
FIG. 2 is a schematic illustrating a portion of the system of FIG. 1 in context of order fulfillment and delivery, according to an embodiment of the present invention.

Referring to FIG. 2, in selected embodiments, the software, hardware, and associated components of the system 10 may be programmed and configured to implement one or more embodiments described herein. A customer may communicate with the first server 24 via the customer device 26 and a communications connection or network 38 to select items for purchase. The first server 24 may also communicate with a third server 30, delivery service 32, and second server 28 via a communications connection 42. The communications connection 42 may be any suitable connection, including the Internet, file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed.

The customer device 26 may include any suitable device, including, but not limited to, a desktop computer, a laptop or notebook computer, a tablet, a handheld mobile device including a cellular telephone, and the like.

Figure 3:
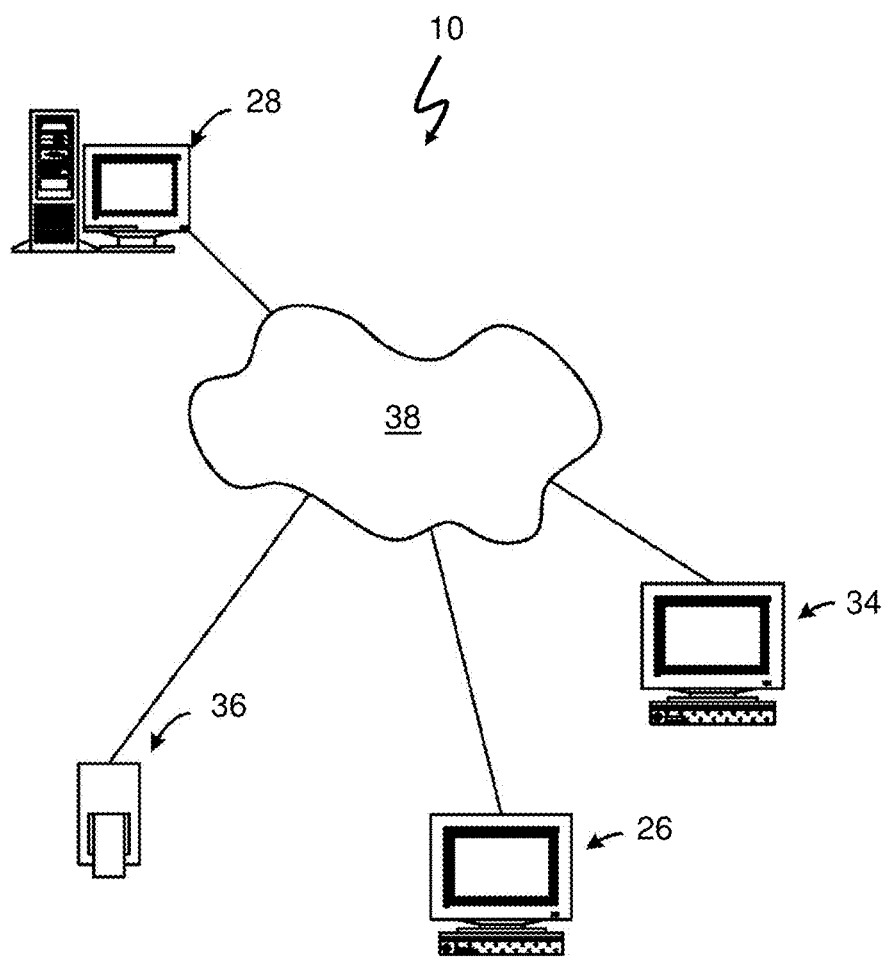
FIG. 3 is a second schematic illustrating a portion of the system of FIG. 1 in context of order fulfillment and delivery, according to an embodiment of the present invention.

Referring to FIG. 3, in selected embodiments, the hardware, software, or hardware and software of first server 24, the second server 28, and the third server 30 may be configured to receive and utilize item information as described herein, performing functions associated with the first server 24 and second server 28. The second server 28 may communicate with the customer device 26, a delivery service computer 34, and an assembler device, such as a store handheld device, 36 via a communications connection or network 38. In this manner, the various aspects of the system may be exemplified as software, modules, nodes, etc. of a store computer or second server 28.

Figure 4:
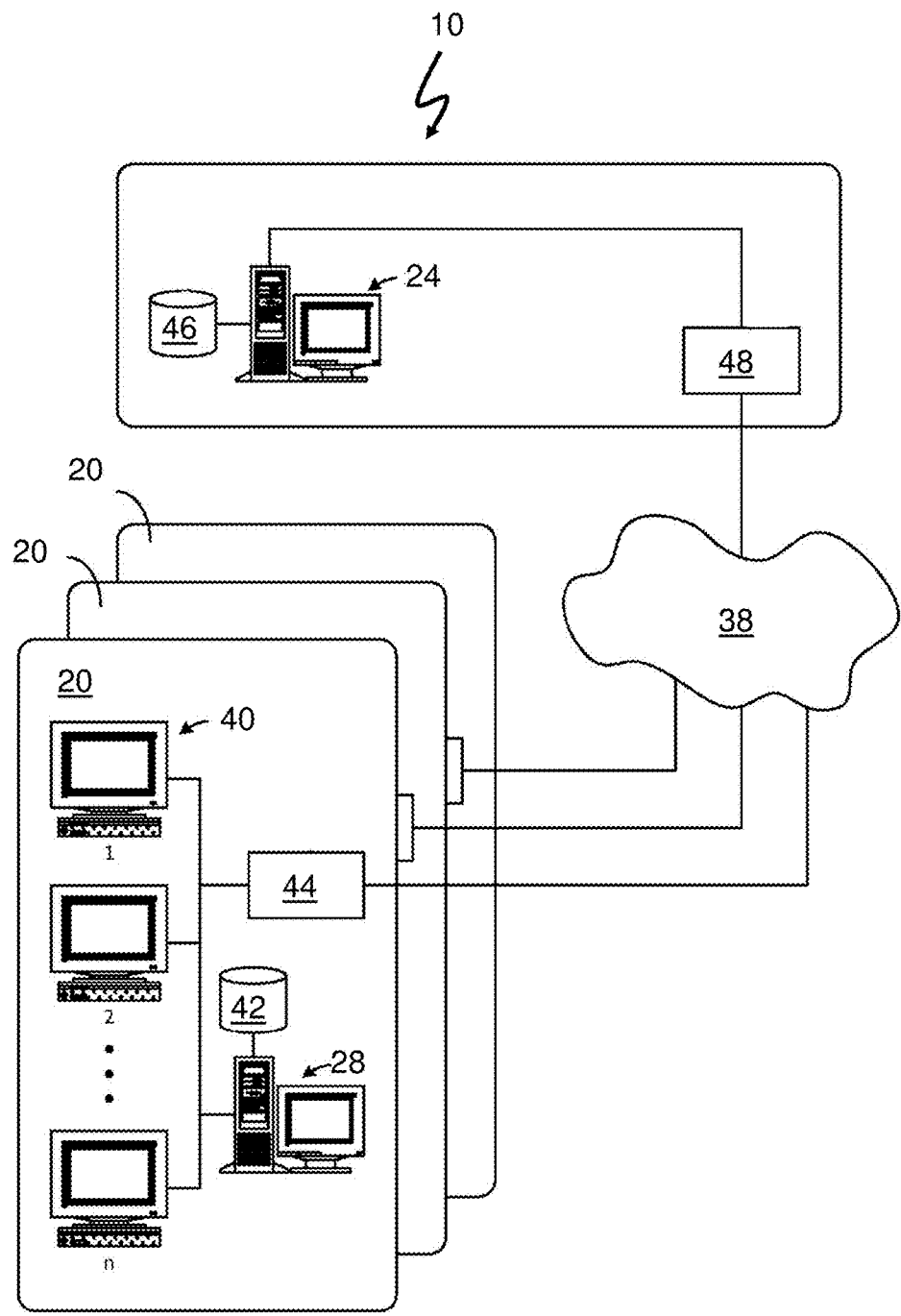
FIG. 4 is a schematic illustrating the system of FIG. 1 in a multiple store environment, according to an embodiment of the present invention.

Referring to FIG. 4, in selected embodiments, the system 10 may operate substantially independently, as a stand-alone unit. Alternately, a store system 10 may operate as a larger system. For example, multiple stores 20 may operate at different locations (e.g., different brick-and-mortar stores, facilities, and/or warehouses). In such embodiments, each local system may have a second server 28 as well as other computers or handheld devices 40, database and data storage devices 42, and networking devices 44 as necessary. Each local system may be connected to the first server 24 via a network or internet connection 38. The first server 24 may be associated with database and data storage device 46 and a network device 48 as necessary.

As discussed above, the customer way desire to pick-up the order at a selected store 20. The system 10 may be configured to establish that the customer has arrived at the selected store 20 and arrange for the final assembly of the customer's order and for it to be delivered to the customer's motor vehicle, e.g., automobile, without the customer having to manually "announce" that the customer has arrived at the store 20.

Figure 5:
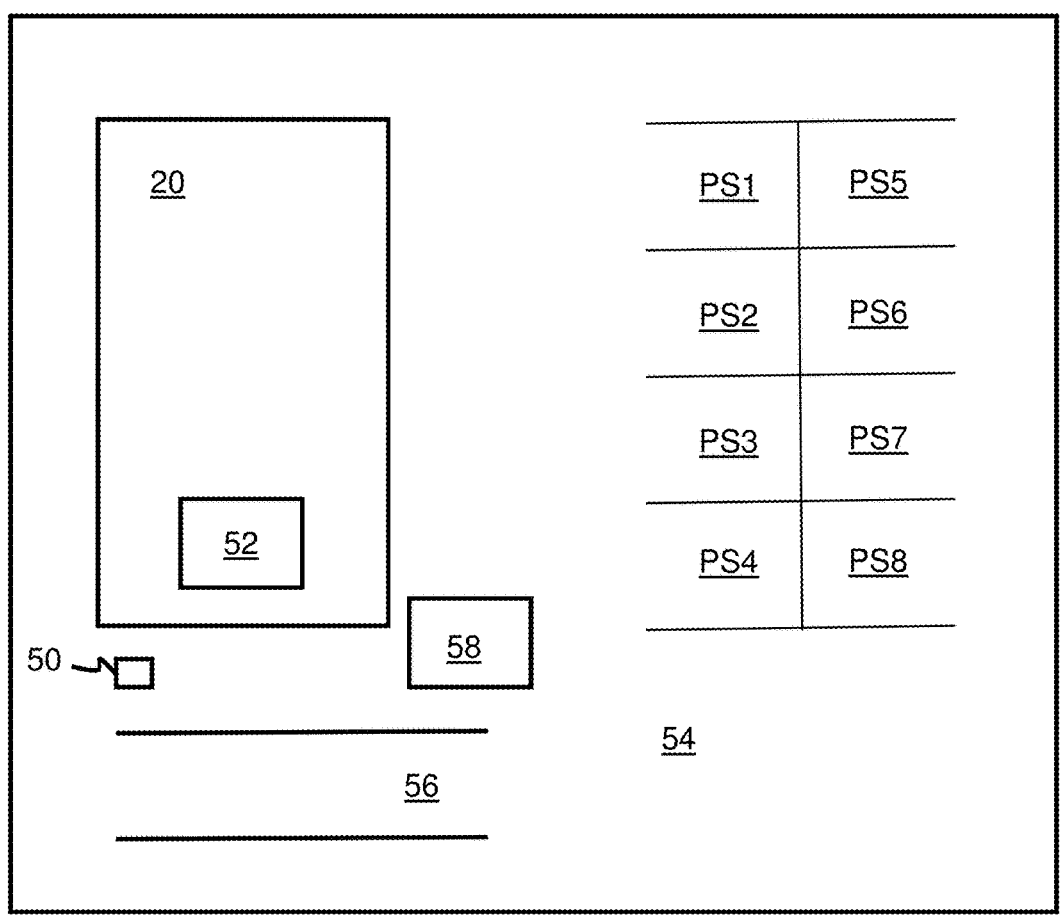
FIG. 5 is an illustration of an exemplary screenshot from the system of FIG. 1, according to an embodiment of the present invention.

With specific reference to FIG. 5, in one embodiment, the system 10 may further include an optical sensor 50 and an optical character recognition unit 52. The database 46 associated with the first server 24 may contain, or have stored thereon, information related to the orders made by customers. When a customer completes an order, the order information pertaining to that order may be sent to the second server 28 which may be located at the selected store 20 or the store 20 that is fulfilling the order. The order information may then be stored in a database 42 associated with the second server 28. The customer order will include at least one good, and as discussed more fully below, may include a customer identification number. In one embodiment, the customer identification number may be embodied in an item associated with the customer that may be identified using suitable means located at the store 20. For instance, in one embodiment, the customer identification number may be the license plate number of the customer's motor vehicle. As discussed more fully below, the second server 28 is configured to receive the customer order placed by the customer and to assist in assembling the customer order for the customer.

In one embodiment, the optical sensor 50 is located at a predetermined location within an order pick-up area 54 associated with the store 20. In general, the predetermined location is established to allow the optical sensor 50 to capture images of the license plates of motor vehicles as the motor vehicles enter the order pick-up area 54. For instance as shown in FIG. 5, in one embodiment the order pick-up area 54 may include a designated driving lane 56 through which the customer drives their motor vehicle upon arriving at the store 20. The optical sensor 50 is located (and aimed) in the general direction of the motor vehicles as the vehicles enter the designated driving lane 56. The optical sensor 50 may be located within a housing (not shown) that includes a visual indicator that informs the customer when a suitable image has been captured. The optical sensor 50 may include any suitable image sensor or camera capable of capturing an image of the license plates (based on the arrangement of the order pick-up area 54.

It should be noted that the other types of sensors may be used in combination with other types of detectable items. For instance, a sensor may be used to detect an item that is particularly associated with (and identifiable with) the customer, such as an RFID chip or other item that may be readily identifiable and associated with a customer.

The optical character recognition unit 52 coupled between the second server 28 and the optical sensor 50. The optical character recognition unit 52 may be configured to receive the captured images from the optical sensor 50, to establish an associated motor vehicle license plate number for each captured image (using, for example, optical character recognition software), and to send the associated motor vehicle license plate numbers to the second server 28. The second server 28 may be further configured to receive the motor vehicle license plate numbers from the optical character recognition unit 52 and to compare the motor vehicle license plate numbers from the optical character recognition unit 52 with the associated customer motor vehicle license plate number.

The optical character recognition unit 52 may be implemented by the second server 28, by a separate computer or computer system located at the store 20, the first server 24, or any other suitable device within the system 10 (see FIG. 2).

If the associated customer motor vehicle license plate number matches one of the received motor vehicle license plate numbers from the optical character recognition unit 52, the second server 28 arrange for the customer order to be delivered to the motor vehicle associated with the customer.

As discussed more fully below, one or more employees or assemblers may utilize the handheld device(s) 36 to assist in assembling the order. In general, the items or goods within the order may be placed in one or more bins. The order may be pre-assembled prior to the expected or requested pick-up time. In one embodiment, certain items, such as perishable goods, are not assembled until the scheduled pick-up time or until it is established that the customer has arrived.

In one embodiment, the bins are loaded onto a conveyor belt (not shown) once arrival of the customer has been established. The customer is then directed to drive towards a pick-up area and the order may be transferred from the bin(s) to the customer's motor vehicle. Information and instructions may be displayed to customers using display 58 positioned relative to the designated driving lane 56.

In one embodiment of the present invention, the store 20 may include a designated area or parking area 58 containing specific parking spaces within the order pick-up area 54. As shown in FIG. 5, in the illustrated embodiment and only for purposes of discussion, the designated area 54 contains 8 parking spaces (PS1-PS8). In one embodiment, the second server 28 maintains a list of the parking spots including whether each parking spot is occupied or empty. Once the arrival of a customer has been established, the customer is directed, via, for example, an appropriate message displayed on the display 58. For example, the message could state: "Customer ID, Please park in Parking Spot 5". The Customer ID may be, e.g., the customer's name, an ID number, and/or the motor vehicle license plate number. The second server 28 may mark the space to which the customer is directed as being occupied and once a delivery has been loaded into the customer's motor vehicle (and the customer has left), the second server 28 may mark the parking spot as being available.

The system 10, as more fully described below, may be further configured to allow the customer to place the customer order through the customer device 26 coupled to the first server 24. The customer device 26 may be a desktop, laptop, or notebook computer, a tablet, mobile device, cellular phone, or any device capable of running an application or app or an Internet browser, or any similar device. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

In one aspect of the present invention, the store 20 at which customer pick-up is scheduled is selectable from a set of stores 20. Information related to the set of stores may be saved in the database 46. The set of stores 20 available to a particular customer may be set or determined by the customer, determined by the customer's location, and/or customer preferences. In one embodiment, the first server is configured to present to the customer a list of the stores 20 and to allow the customer to select a desired store from the list of stores 20.

In another aspect of the present invention, some of the stores available to the customer may be equipped with an optical sensor 50 and an optical character recognition unit 52. In one embodiment, the list of stores 20 may be determined or established as a function of customer preferences, e.g., the customer may specify that only stores that have an optical sensor 50 and an optical character recognition unit 52 are to be included.

In another embodiment, if the store 20 selected by the customer includes an optical sensor 50 and an optical character recognition unit 52, the first server 24 may prompt the customer to enter the license plate number of the motor vehicle that will be used in the pick-up process. Alternatively, if the database 46 has a license plate number or numbers associated with the customer stored therein, the first server 24 may request that the customer confirm the license plate number, pick a license plate number from a list, and/or enter a new license plate number.

In another aspect of the invention, a method to facilitate the assembly and pick-up by the customer of the order is provided. In a first step, the customer order is received at the first server 24. In one embodiment, the first server 24 receives the order from an external system (not shown). Alternatively, the first server 24 may allow the user to place the order either from a website associated with the store 20 or via specialized software running on the customer device 26 (see above). The customer order is associated with a customer and includes at least one good. The customer order further has an associated customer identification number such as an associated customer motor vehicle license plate number. The associated customer motor vehicle license plate number is associated with a motor vehicle associated with the customer. The customer order is stored, by the first server 24, in the database 46. The system 10 may be configured to facilitate or arrange to have the customer order assembled at the store for the customer.

In one embodiment, the first server 24 provides the customer order to the second server 28 that may be located at the store 20. In general, the second server 28 provides a list of the goods in the order, as well as the selected pick-up time to one or more employees of the store 20 (assemblers). The assemblers gather the goods and place the goods in a bin or bins such that the order can be provided to or adjacent to the customer's motor vehicle. As described in more depth below, each assembly may be equipped with a handheld device 36 that provides the assembler access to the list and allows the assembler to check off goods from the list as the goods are assembled and placed in a bin. In one embodiment, each handheld device 36 includes a Universal Product Code (UPC) scanner. Using the UPC scanner on the handheld device 36, the assemblers scan the UPC code of the item as the item is placed in the bin.

In a next step of the method, images of license plates of motor vehicles as the motor vehicles enter an order pick-up area located at the store 20 are captured using the optical sensor 50. The captured images are sent to and received at, the optical character recognition unit 52 coupled between the second server 28 and the optical sensor 50. The optical character recognition unit 52 establishes an associated motor vehicle license plate number for each captured image. The motor vehicle license plate numbers from the optical character recognition unit are compared with the associated customer motor vehicle license plate number. If the associated customer motor vehicle license plate number (of the customer order) matches one of the received motor vehicle license plate numbers from the optical character recognition unit, the system 10 arranges the customer order to be delivered to the motor vehicle associated with the customer. For example as discussed, the system 10 may direct the customer to park their motor vehicle to an unoccupied parking spot PS1-PS8 and then when the order is fully assembled direct an employee of the store 20, via a handheld device 36 for example, to deliver the bin(s) containing the order to the assigned parking spot PS1-PS8.

Referring to FIGS. 5-10, a customer may use a store website or specially designed application or app 60 to order various items for delivery to a customer location 22 or pick-up at a specified store 20. In an on-line store environment, the customer may browse through available items and may select items for purchase. The first server 24 may receive customer information. A customer may create an account or logon to an existing account with the first server 24, or may enter this information while making a purchase. The first server 24 transmits customer information and the customer order to the second server 28. FIGS. 5-10 illustrate samples of portions, screen shots, or dialogs provided solely for the purpose of explanation.

Figure 6:
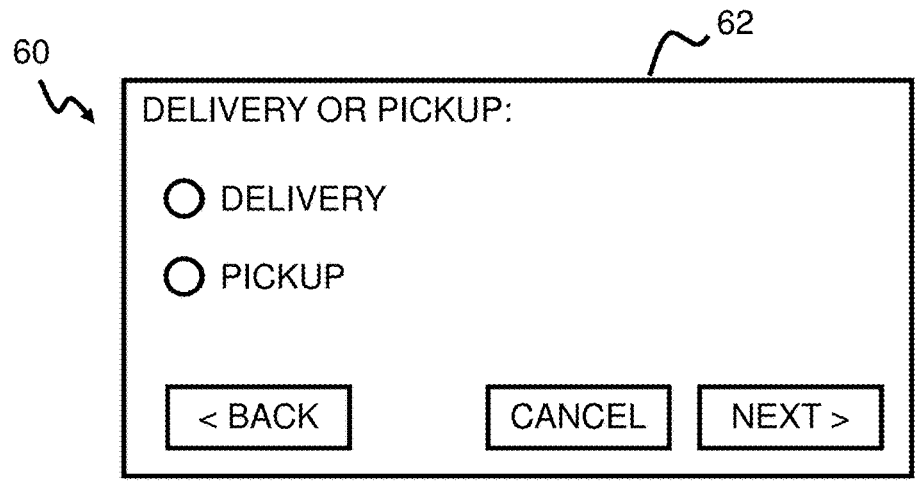
FIG. 6 is an illustration of an exemplary screenshot from the system of FIG. 1, according to an embodiment of the present invention.
Figure 7:
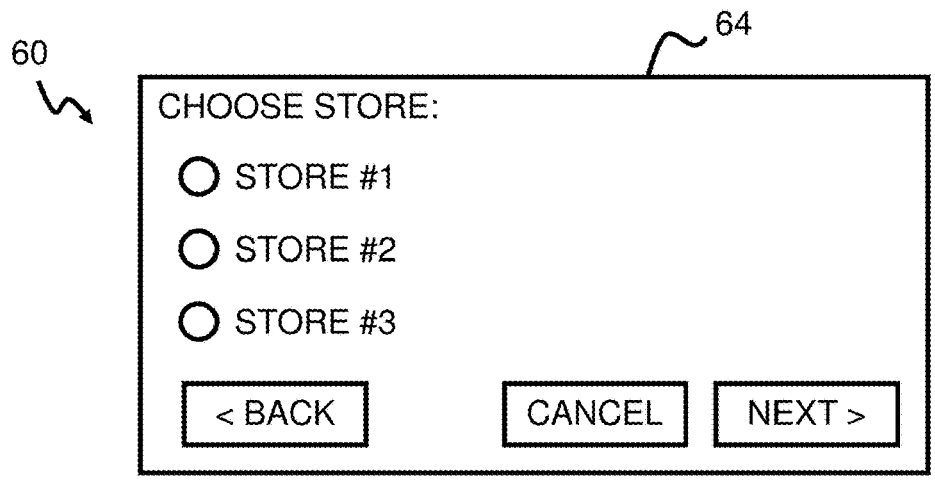
FIG. 7 is an illustration of an exemplary screenshot from the system of FIG. 1, according to an embodiment of the present invention.

With specific reference to FIG. 6, a first exemplary screenshot or dialog box 62, may be displayed after the customer has created a new account or logged onto an existing account. The first dialog 62 allows the customer to designate if the current order is for delivery or pick-up.

If the customer designates that the current customer order will be for pick-up, a second exemplary dialog box 62 allows the customer to pick a store 20 from a set of stores 20. If the system 10 has only one associated store 20 than this dialog box 62 is not displayed. As discussed above, the list of stores 20 may contain stores established as a function of the customer's location and/or stored preferences. The illustrated list contains three stores 20. It should be noted that the present invention is not listed to any specific number of stores 20.

As discussed above, each store 20 in the list may or may not have an optical sensor 50. In one embodiment, the list may contain a visual indicator (such as an appropriate icon next to the name of the store 20) that provides an indicator to the customer if the store 20 includes an optical sensor 50.

Figure 8:
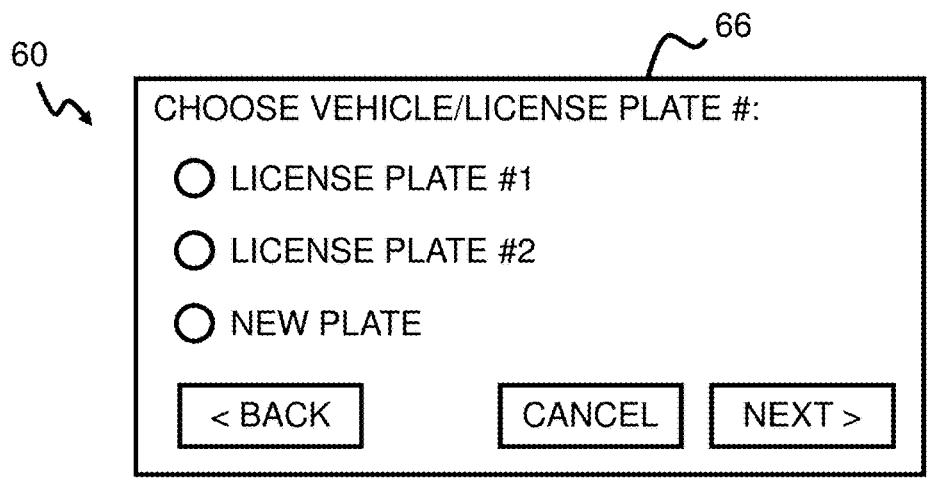
FIG. 8 is an illustration of an exemplary screenshot from the system of FIG. 1, according to an embodiment of the present invention.

If the customer selects a store 20 having an optical sensor 50, a third dialog box 60 may be displayed (as shown in FIG. 8). In the third dialog box 60, the customer may choose from previously stored license plate numbers or enter a new license plate number.

In a fourth dialog box 68, an example of which is shown in FIG. 9, the customer may enter a desired pick-up date and time.

FIG. 10 illustrates an exemplary fifth dialog box 70 which shows the customer's virtual order basket. Once the customer has added all desired items to the order basket and submitted the order, the first server 24 stores the customer order in the database 46 and transmits the customer order to the second server 28 located at the selected store 20.

As discussed above, once the first server 24 receives the customer order (from an external system or directly from the customer), the first server 24 may transmit the customer to the second server 28. The second server 28 may be located at the selected store 20. As discussed below, one or more handheld devices 36 may be used by the assemblers to assemble the order for delivery or pick-up. For each order, the first server 24 may transmit an order identification such as a customer name, order number, customer identification number and/or license plate number, etc. . . . along with a list of items from the store 20 which pertain to that order. The second server 28 may assist store employees in collecting items for each order.

In one example, the second server 28 may be associated with a particular store 20. A store 20 may include the second server 28 and one or more handheld devices 36. The second server 28 may receive order information corresponding from the first server 24. The second server 28 may streamline the collection of items from the store 20. The second server 28 may include a layout of the store 20 which indicates which types of items are found on the various aisles in the store 20. The second server 28 may store information regarding where different commodity groups or product types are located throughout the store 20. The second server 28 may store a product picking route which directs a store employee through the store 20 in a predetermined manner.

The second server 28 may receive a customer order and arrange the items on the customer order so that the items are encountered sequentially in the store 20 as a store employee follows a predetermined picking route through the store 20. The second server 28 may receive a number of customer orders and may combine items from all of the orders into a single pick list, allowing a store employee to follow a pick route a single time through the store 20 to collect all items for all of the orders. The second server 28 may divide the items into a few different groups. For example, the second server 28 may divide the order items into a group of frozen items, a group of refrigerated items, and a group of non-cooled items. The second server 28 may allow multiple store employees to work separately to pick items for the orders while still working in a coordinated manner and moving throughout the store 20 efficiently.

Figure 13:
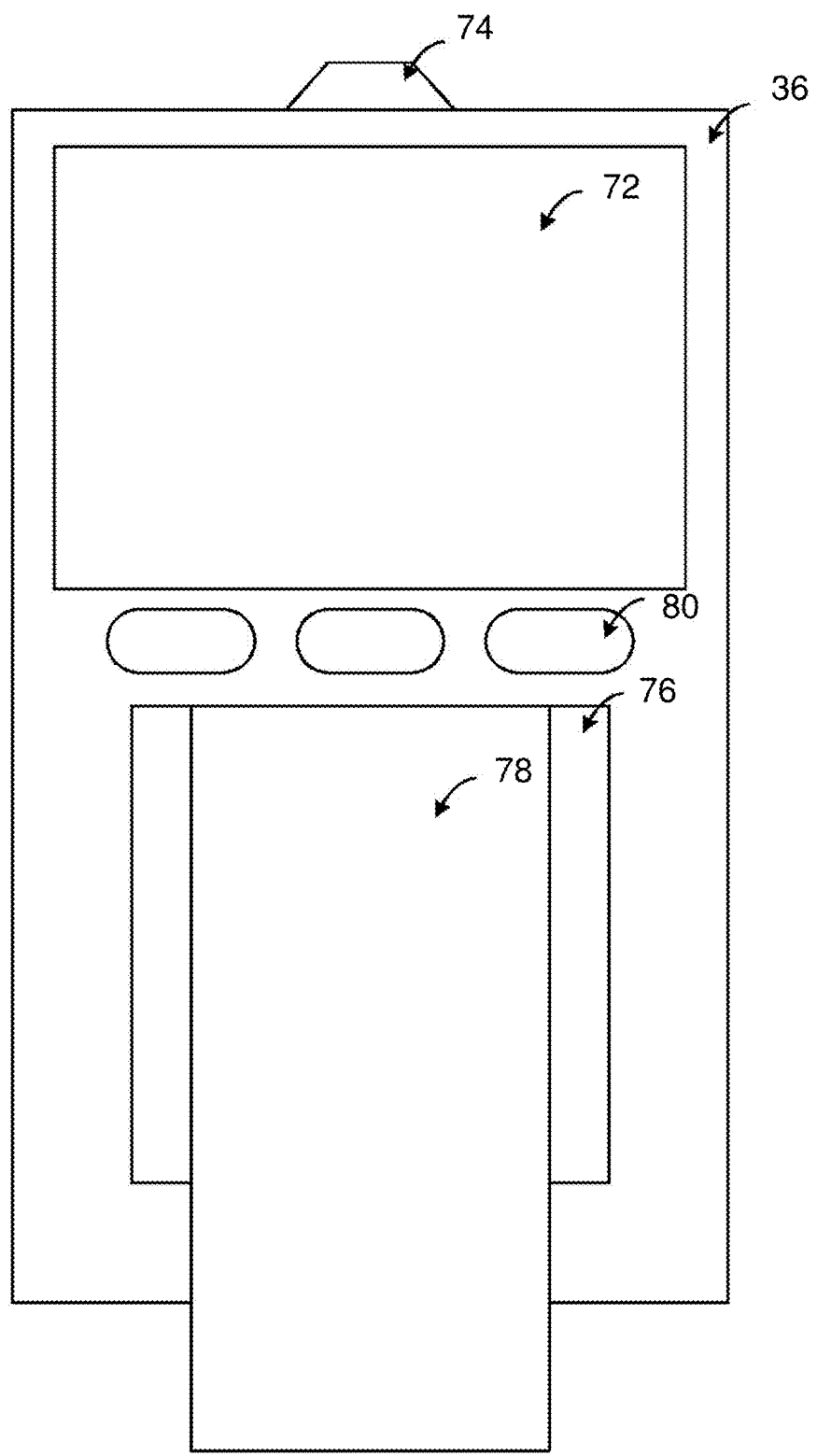
FIG. 13 is a schematic of a handheld device, according to an embodiment of the present invention.

Referring to FIG. 13, a store employee or assembler may use an assembler device 36, such as handheld computer device, 36 while collecting items for the customer orders. The handheld device 36 may perform several functions. The handheld device 36 may communicate with the second server 28 to receive a list of items which need to be collected from the store 20 to fulfill the orders. The handheld device 36 may include a display 72. The display 72 may present a list of items to the store employee in the order that the employee will encounter the items while following a picking route through the store 20. The display 72 may also present the picking route to the employee; indicating how the employee should progress through the store 20 while collecting items for the customer order(s).

The second server 28 may store item information for all store items which are available for purchase. For example, the second server 28 may store a product identification code for each available store item, the UPC code for each item, item location on the store shelves, and other information as necessary. When a store employee collects an item for the customer orders, the employee may use a scanner 74 on the handheld device 36 to scan the item UPC code. The handheld device 36 may determine if the item is necessary for the customer orders and may indicate whether or not the item is correct to the employee. If correct, the employee may be directed to place the item in a particular collection receptacle or bin for the respective customer order. The handheld device 36 may use a printer 76 to print a sticker label 78 for the item. The sticker label 78 may include a code, barcode, or other machine readable code to identify a particular customer order to which the item pertains. The label 78 may be affixed to the item as the employee collects the item. If desired, the employee may carry multiple boxes, containers, or bins corresponding to the various customer orders and may sort items into the appropriate order receptacle as the items are collected throughout the store 20. It is, however, appreciated that there may often be a sufficient number of customer orders to make it impractical to carry sufficient order receptacles through the store 20. The employee may place items into a single receptacle and bring items to a back area of the store 20 for sorting into different customer orders.

The handheld device 36 may include buttons 80 and other input/output or customer interface devices as permit the store employee to perform the designated functions. The handheld device 36 may also include a communications device to permit the handheld device 36 to communicate with the second server 26, such as by communicating over a store wireless network.

Typically, customer orders are finalized and presented via second server 28 after being finalized. The second server 28 may allow store employees to see customer orders which have not been verified. This may allow store employees to monitor large orders or orders in a period of high demand and, if desired, start to collect items for these orders before the desired pick-up time or scheduled delivery time is finalized to be able to meet the demand.

In one aspect the invention, the system 10 addresses the situation in which one or more of the goods in the customer order are currently unavailable. For instance, as discussed above, the system 10 allows the customer to select the store or facility at which the goods are to be picked up or from which the customer order is to be delivered. In some situations, the selected store or facility may not have or may be out of stock of a particular good.

In one embodiment, the second server 28 or order fulfillment system 12 is configured to receive a customer order placed by a customer and to assist an assembler in assembling the customer order for the customer. As discussed above, the customer may have placed the order on-line or remotely ordered using the customer device 26. The customer order may be received at the first server 24 and stored in a database. The customer order generally includes at least one good.

In one embodiment information related to customer order is stored in a database 46. The first or order server 24 is coupled to the database 46 and the order fulfillment system 12. In general, the order fulfillment system 12 is configured to allow the customer to place the customer order through the customer device 26, which may then be stored in the database 46 by the order server 24.

The assembler device or handheld device 36 which is generally located at the facility or store may be coupled to or in communication with the order fulfillment system 12. The assembler device 36 is configured to be operable by the assembler. For instance, the assembler device 36 may be configured to allow the assembler to view a list of the good(s) in the customer order.

In one embodiment, the assembler device 36 includes a Universal Product Code (UPC) reader or scanner 74. The list of goods in the customer order may be displayed on the display 72 of the assembler device 36. Thus, the assembler can read the list of goods in the customer order from the display and, as the assembler traverses the store or facility, place the items or goods in a bin or bins (see above). In one embodiment, the assembler may use the UPC reader to read the UPC code of the item as the item is placed in the bin. The assembler device 36 responsively checks the item or good off of the list of goods in the customer order.

In one aspect of the present invention, if a particular good or item is not available at the store or facility, the assembler may establish a list of substitute goods. In one embodiment, the assembler may choose the substitute goods from goods that are available. In one embodiment, the assembler may establish the list of goods by using the UPC reader 74 to read the UPC of the goods the assembler has chosen to include.

In another aspect of the present invention, the database 42, 44 may include images and/or other information related to the goods available at the facility. When the list of substitute goods is established, the list of substitute goods, along with the associated images and/or other information, e.g., nutritional information, may be communicated to the customer (see below). In one embodiment, the list of substitute goods, including the images and/or other information, is sent from the order fulfillment system 12, through the first or order server 24 to the customer device 26.

As will be more fully discussed below, the order fulfillment system 12, includes the second server 28 and the assembler device 36. If one of the good(s) in the customer order are not available, the assembler is allowed to establish a list of (potential) substitute goods. The list of substitute goods may then be communicated to the customer and the customer allowed to choose one of the substitute goods to be included in the order. If, however, the customer does not choose a substitute good within a predetermined time period, then the assembler may be allowed to choose or select a substitute good to be included in the order. The predetermined time period may be predefined, modifiable by the assembler, and/or based on one of more factors, including, e.g., the desired delivery or pick-up time.

In one embodiment, the order server may be configured to communicate the list of substitute goods to the customer device. The customer is allowed to choose one of the substitute goods as an alternative good, the order fulfillment server being further configured to, if after a predetermined time the customer does not respond with a chosen one of the substitute goods, allow the assembler, using the assembler device, to choose an alternative good from the list of substitute goods, and to establish a revised customer order including the alternative good.

In another aspect of the present invention, the database 46 may have stored thereon a customer record for a plurality of customers. Each customer record may include a preferred method of communication for the associated customer. In one embodiment, the list of substitute goods is sent to the customer device using the preferred method of communication. For example, the preferred method of communication may include an automated telephone call, an email, an instant message, a multimedia message service message, a message sent to a specific application on the customer device, or any suitable communications channel. The method of communication allows the customer to select one of the substitute goods as the alternative good. Alternatively, a link to a website may be sent to the customer device using the preferred method of communication.

In one aspect of the present invention, multiple assembler devices 36 may be used at the store or facility. Each of the assembler devices may be operated by a respective assembler to allow the respective assembler to assist in assembling the customer order.

In another aspect of the present invention, the chosen one of the substitute goods is selected as the alternative good. The alternative good is communicated back to the assembler. The assembler includes the alternative good in the customer order. The order fulfillment system 12 modifies the customer order to include the alternative good and stores the revised customer order in the database 42, 46.

The alternative good may also be stored in the associated customer record for the associated customer. In the situation where the same desired goods appear in a customer order for the same customer and the desired good is unavailable again, the stored alternative good may be substituted automatically or automatically included in the list of substituted goods.

The present invention provides a method that is designed to assist an employee or assembler in assembling the items in a customer order. As discussed above, the customer order may be received at the order fulfillment system 12. The order fulfillment system 12 may be associated with, and at least partially located at the facility or store at which the customer order is being assembled. In one embodiment, the order fulfillment system 12 includes the second server 28 and one or more handheld or assembler devices 36.

The method includes the step allowing the assembler, using the assembler device 36 to view a list of the at least one good in the order. In one embodiment, the assembler device(s) 36 are coupled to the second server 28 and configured to receive the items or goods in the customer order. The assembler device(s) 36 display the customer order (or a portion thereof) and the assembler traverses the facility or store in order to find and place into a bin the goods for the order.

The method further includes the step of allowing the assembler to establish, using the assembler device 36, a list of substitute goods, if one of the at least one good is not available at the facility.

As discussed above, in one embodiment the assembler uses the UPC reader 74 to scan and identify the goods or items as the goods or items are found and placed in the bin(s). The assembler device 36 identifies the good or items, and checks them off the list of the items or goods on the customer list.

Figure 11:
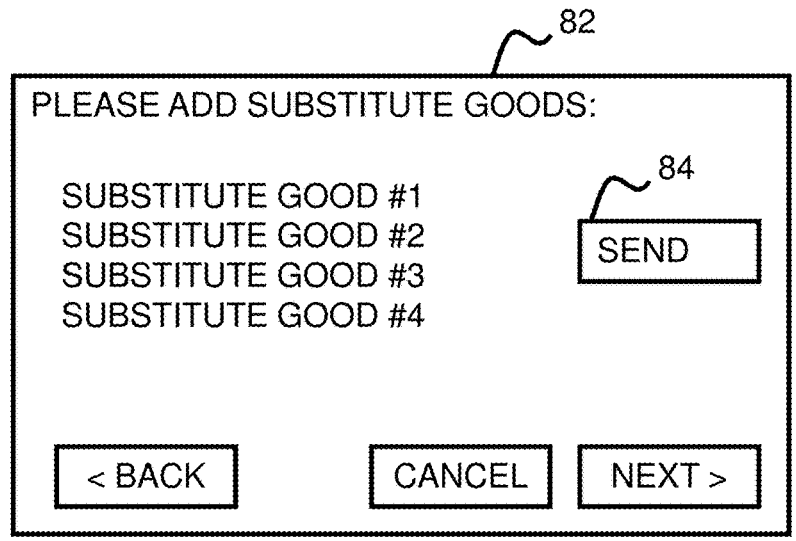
FIG. 11 is an illustration of an exemplary screenshot from the system of FIG. 1, according to an embodiment of the present invention.

However, if an item or good is not available, the assembler may scan the UPC goods or items that are substitutes for the unavailable good. With particular reference to FIG. 11, an exemplary screenshot of a dialog or screen 82 displayed on the display 72 of the handheld device 36 is illustrated. The assembler may be prompted to enter or add items to the list of substitute goods or items. In one embodiment, the assembler may add items to the list by scanning or reading the UPC code of a chosen potential substitute good or items.

Figure 12:
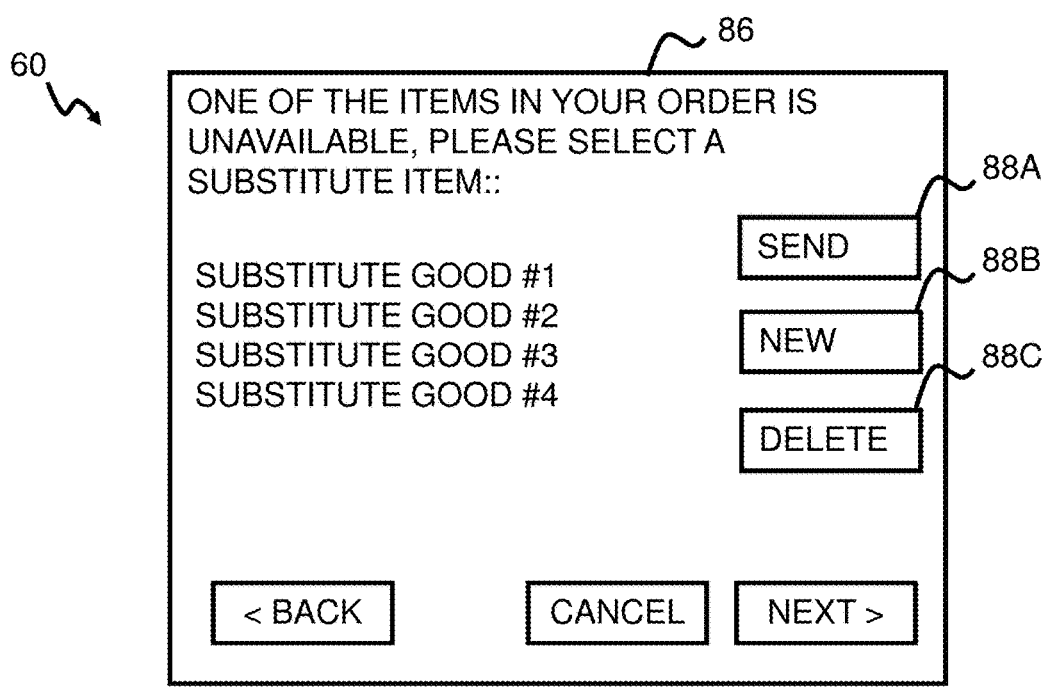
FIG. 12 is an illustration of an exemplary screenshot from the system of FIG. 1, according to an embodiment of the present invention.

Once the list has been established by the assembler, the assembler may send the list of substitute goods to the customer (see above) by selecting, for example, a SEND button 84. As described above, the customer may receive the list of substitute goods via the preferred communications method at the customer device 26. A sample dialog box or screen sheet 86 of the application or webpage 60 to be displayed on the customer device 26 is shown in FIG. 12. In the dialog box 86, the list of substitute goods may be displayed and the customer prompted to select one of the substitute goods on the list as the alternative good. Once selected, the customer may send the chosen alternative good back to the assembler by selecting a SEND button 88A.

Alternatively, the customer may select a new substitute good as the alternative good by selecting a NEW button 88B which would take the customer back to an inventory of available goods so that the customer may chose a different substitute good and send the different substitute good back to the assembler as the alternative good. Alternatively, the customer may choose to delete the good from the customer order by selecting a DELETE button 88C.

Once a chosen alternative good is sent back to the assembler, the assembler retrieves the substitute good and places the substitute good in the bin. A new or revised customer order, including the substitute good may be established and stored in the database.

Figure 14:
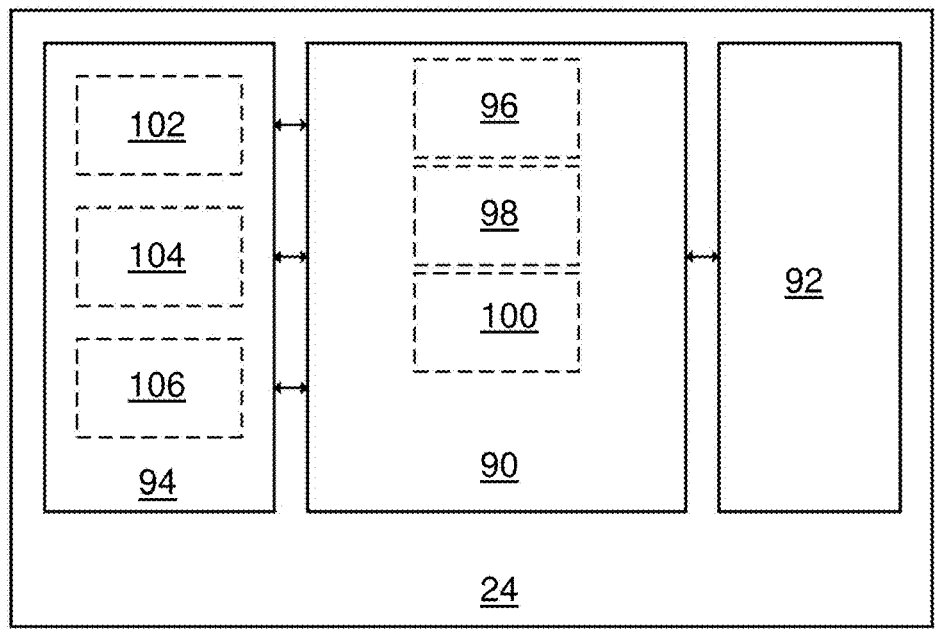
FIG. 14 is a schematic illustrating example components of a server, according to an embodiment of the present invention; and, FIG. 15 is a schematic illustrating example components of a handheld device, according to an embodiment of the present invention.

As referenced above, the first server 24 may be configured to perform one or more functions associated with receiving an order from a customer, managing the delivery or pick-up of the customer orders, and streamlining the collection of items for customer orders. FIG. 14 illustrates an example of the first server 24 configured to perform one or more of the requested functions. In the illustrated embodiment, the first server 24 may include a processing device 90, a communication device 92, and a memory device 94.

The processing device 90 can include memory, e.g., read only memory (ROM) and random access memory (RAM), storing processor-executable instructions and one or more processors that execute the processor-executable instructions. In embodiments where the processing device 90 includes two or more processors, the processors can operate in a parallel or distributed manner. In an example, the processing device 90 may execute a web or application module 96, a delivery module 98, and an order fulfillment module 100.

The communication device 92 is a device that allows the first server 24 to communicate with another device, e.g., the customer device 26, delivery service computer 34, handheld device 36, etc. The communication device 92 can include one or more wireless transceivers for performing wireless communication and/or one or more communication ports for performing wired communication.

The memory device 94 is a device that stores data generated or received by the first server 24. The memory device 94 can include, but is not limited to a hard disc drive, an optical disc drive, and/or a flash memory drive. Further, the memory device 94 may be distributed and located at multiple locations. The memory device 94 is accessible to the processing device 90. In some embodiments, the memory device 94 stores a customer database 102, an item database 104, and a delivery database 106.

In some examples, the customer database 102 can store information associated with a customer. The customer database 102 may, for example, store information associated with a customer account and may include account preferences and customer contact information. The customer database 102 may also store information regarding a customer delivery address as well as specific details regarding delivery of items to the delivery address. The customer database 102 may be queried by the processing device 90 and may provide information to the processing device to facilitate receiving an order from a customer and delivering an order to the customer.

In some examples, the item database 104 stores item information associated with items or types of items in the store 20. For example, the item database 104 may store identification codes, Universal Product Codes (UPC) codes, item location in the store 20, as well as other information associated with the items. By way of example, the item database 104 may be queried by the processing device 90 and may transmit information to the processing device to facilitate the use of item data.

In some examples, the delivery database 106 stores information to facilitate delivery of customer orders to a customer location 22. The delivery database 106 may store information regarding a map of a delivery area or an area around a store 20, street and traffic information for a delivery area, delivery routes, transit times associated with a delivery area, etc.

The processing device 90 may execute the web or application module 96. The web or application module 96 may present a store interface and item information to a customer, receive customer information and order information, and otherwise handle the purchase transaction with a customer as described herein. The processing device 90 may also execute a delivery module 98. The delivery module may receive customer delivery address information from the web or application module 96 and may determine customer location, compare location with existing delivery routes, determine available delivery times, schedule deliveries, create delivery routes, and otherwise manage delivery of customer orders. The web or application module 96 may receive potential delivery times from the delivery module 98 and present these potential delivery times to a customer to allow the customer to select a delivery window for their order. The processing device 90 may further close orders for a delivery route, finalize the delivery route, and interface with a delivery service 34 to deliver orders to customers.

The processing device 90 may execute an order fulfillment module 100. The order fulfillment module may receive customer order information for a delivery route and may facilitate the collection of items from a store to fulfill the customer orders. The order fulfillment module 100 may combine orders together, arrange items according to a predetermined picking order through a store 20, and direct a store employee through the store 20 to collect items for the customer orders.

Figure 15:
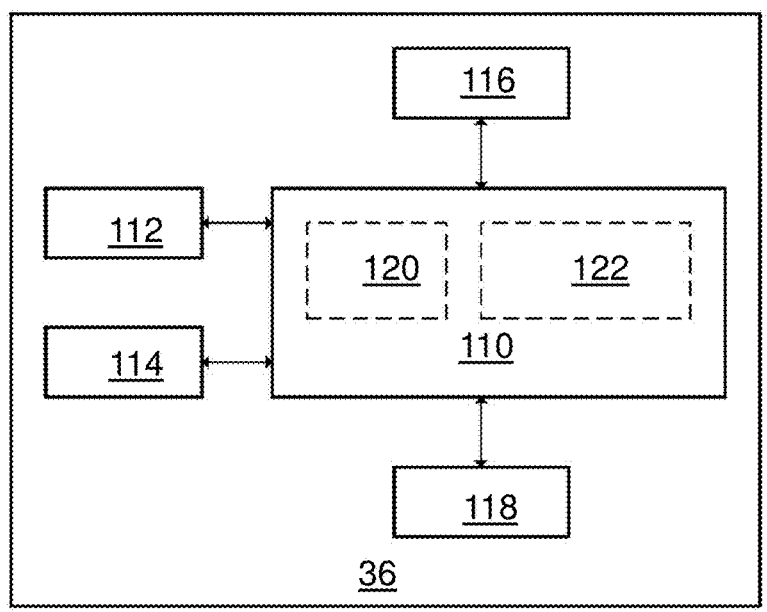

Referring now to FIG. 15, a schematic showing example components of the handheld device 36 is illustrated. The handheld device 36 may include a processing device 110, a user interface 112, an output device 114, a communication device 116, and a memory device 118. It is noted that the handheld device 36 can include other components and some of the components may not be required in every example.

The processing device 110 can include memory, e.g., read only memory (ROM) and random access memory (RAM), storing processor-executable instructions and one or more processors that execute the processor-executable instructions. In embodiments where the processing device 110 includes two or more processors, the processors can operate in a parallel or distributed manner. The processing device 110 can execute an operating system of the handheld device 36. In the illustrative example, the processing device 110 also executes a software module 120 such as scanning and printing software and an order fulfillment module 122.

The user interface 112 is a device that allows a user, a store employee in particular, to interact with the handheld device 36. While one user interface 112 is shown, the term "user interface" can include, but is not limited to, a touch screen, a physical keyboard, a mouse, a microphone, and/or a speaker. The output device 114 is a device which allows a store employee to output information from the handheld device 36. In particular, the output device 114 may allow a store employee to print labels for store items and associate collected store items with a particular customer order. The communication device 116 is a device that allows the handheld device 36 to communicate with another device, e.g., the first server 24, the second server 28 or the order fulfillment system 12. The communication device 116 can include one or more wireless transceivers for performing wireless communication and/or one or more communication ports for performing wired communication. The memory device 118 is a device that stores data generated or received by the handheld device 36. The memory device 118 can include, but is not limited to, a hard disc drive, an optical disc drive, and/or a flash memory drive. The software module 120 may be stored on the memory device 118 and the order fulfillment module 122 may be created from the software module 120.

The order fulfillment module 122 allows a user, a store employee in particular, to efficiently collect items from a store 20 to fulfill customer orders. The order fulfillment module 122 may execute some or all of the functions described herein to receive one or more customer orders, combine those customer orders, order items in the customer orders sequentially according to a predetermined picking route through the store 20, and guide an employee through the store 20 to collect the items necessary to fulfill the customer orders.

The examples discussed provide significant advantages. As a customer places an order, actual customer information may be used to determine accurate delivery times for the order. These delivery times allow the store 20 to offer the customer delivery windows according to actual availability on a delivery route. The determination of delivery availability may be performed in real time and customers may be offered verified delivery windows for delivery on the same day that the order is placed. The delivery route may be managed in a way that allows for same day delivery while still creating a delivery route which is efficient. A delivery route may be appended with actual customer information including specific information about the delivery location, customer delivery requests, etc.

Items for one or multiple customer orders may be collected quickly and efficiently. Items for multiple customer orders may be collected in an hour or less after a delivery route is closed to future orders. Store employees may be directed through a store 20 in a predetermined picking route and items may be presented to the employees on a handheld device 36 in the order that the employee will encounter the items. The handheld device 36 can scan and track items to verify that the orders are fulfilled, and can also label items to facilitate the sorting of the items into multiple packages for delivery to multiple customers. A store 20 is able to deliver orders to many customers on the same day that the order is placed while maintaining cost effective and efficient order picking and delivery.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A system comprising:
an order fulfillment system associated with a facility, the order fulfillment system being configured to receive a customer order placed by a customer through a customer device and to display the customer order to an assembler device when an assembler is assembling the customer order for the customer, the customer order including at least one good, and the order fulfillment system comprises a first server and a second server, wherein the first server stores motor vehicle license plate numbers associated with the customer and prompts the customer to select a motor vehicle license plate number of motor vehicle license plates stored in the first server prior to a pick-up time of the customer order at the facility;
an optical sensor;
an optical character recognition system;
the assembler device being configured to communicate with the first server of the order fulfillment system when one good of the at least one good of the customer order is not available at the facility, the assembler device being configured to perform:
displaying a list of the at least one good in the customer order, and
receiving a list of substitute goods for the one good; and
a database configured to store information related to customer orders;
wherein:
the first server is coupled to the database and the order fulfillment system; and
the first server is configured to:
receive the customer order from the customer through the customer device coupled to the first server;
store the customer order in the database, the customer orders comprising the customer order;
send the list of substitute goods to the customer using a method of communication requested by the customer, wherein the list of substitute goods comprises associated images of each good on the list of substitute goods;

wait a predetermined time to receive from the customer a first selection of a first substitute good from the list of substitute goods, wherein:
the first server is configured to receive and does receive a response from the customer regarding the list of substitute goods sent to the customer, wherein the response from the customer either (a) selects the first-substitute good from the list of substitute goods to replace the one good that is not available at the facility or (b) deletes the one good of the at least one good that is not available at the facility from the customer order; and
after receiving the response from the customer, (a) when the customer selected the first substitute good to replace the one good that is not available at the facility, then the first server revises the customer order to include the first substitute good and delete the one good of the at least one good that is not available at the facility from the customer order, or (b) when the customer deleted the one good, then the first server revises the customer order to delete the one good of the at least one good from the customer order; and
when the first server does not receive the response from the customer within the predetermined time, receive from the assembler device a selection of a second substitute good from the list of substitute goods to replace the one good that is not available at the facility to revise the customer order to include the second substitute good, wherein the assembler selects the second substitute good to replace the one good that is not available at the facility based on at least the pick-up time requested by the customer;
the second server is configured to determine, by communicating to (a) the first server and (b) the assembler device, the pick-up time at the facility, wherein the first server receives the motor vehicle license plate number of a vehicle confirmed by the customer to be used to pick up the customer order during the pick-up time, and wherein the first server provides the customer order and the motor vehicle license plate number of the vehicle confirmed by the customer to the second server, wherein the second server provides the customer order, as revised, to be assembled to the assembler device;
the optical sensor captures images of the motor vehicle license plate upon arrival at the facility and communicates with the (a) second server and (b) the optical character recognition system;
the optical character recognition system matches the images captured by the optical sensor with the motor vehicle license plate number for a positive identification of the vehicle; and
the second server communicates with the assembler device to deliver an assembled order, based on the customer order, as revised, to the customer associated with the motor vehicle license plate number, as positively identified.

2. The system of claim 1, wherein:
the assembler device is configured to scan universal product codes of goods that are available at the facility; and
the list of substitute goods comprises at least a portion of the goods for which the universal product codes are scanned by the assembler device.

3. The system of claim 2, wherein:
the database comprises images of the goods available at the facility;
the first server is configured to provide the images of each of the goods in the list of substitute goods to a graphical user interface of the customer device; and
the images of the goods in the list of substitute goods are based on the universal product codes, as scanned.

4. The system of claim 1, wherein:
the database comprises information associated with each of a plurality of customers in customer records associated with the each of the plurality of customers, the plurality of customers comprising the customer; and
the customer records for the each of the plurality of customers comprise indications of methods of communication requested by the each of the plurality of customers.

5. The system of claim 4, wherein the list of substitute goods is sent to the customer device via the first server using the method of communication, and wherein the list of substitute goods further comprises other information associated with the each good on the list of substitute goods.

6. The system of claim 5, wherein the method of communication is at least one of an automated telephone call, an email, an instant message, a multimedia message service message, or a message sent to a specific application on the customer device.

7. The system of claim 4, wherein a link to a website is sent to the customer device by the first server using the method of communication.

8. The system of claim 1, further comprising:
multiple assembler devices, each of the multiple assembler devices being operable by a respective assembler and being configured to display the customer order to the respective assembler when the respective assembler is assembling the customer order, wherein the multiple assembler devices comprise the assembler device.

9. The system of claim 4, wherein the first substitute good of the list of substitute goods is stored in the customer record associated with the customer.

10. The system of claim 9, wherein the first substitute good of the list of substitute goods is included in a future list of substitute goods for the customer.

11. A method comprising:
receiving, at an order fulfillment system associated with a facility, a customer order placed by a customer through a customer device, the order fulfillment system being configured to display the customer order to an assembler device when an assembler is assembling the customer order for the customer, the customer order including at least one good, and the order fulfillment system comprises a first server, a second server, an optical sensor, and an optical character recognition system, wherein the first server stores motor vehicle license plate numbers associated with the customer and prompts the customer to select a motor vehicle license plate number of motor vehicle license plates stored in the first server prior to a pick-up time of the customer order at the facility;
displaying, using the assembler device being configured to communicate with the first server of the order fulfillment system when one good of the at least one good of the customer order is not available at the facility, the assembler device being configured to perform (a) displaying a list of the at least one good in the customer order and (b) receiving a list of substitute goods for the one good;

storing, by the first server, information related to customer orders in a database and the order fulfillment system, wherein the customer order is received at the first server from the customer through the customer device coupled to the first server;

storing, by the first server, the customer order in the database, the customer orders comprising the customer order;

sending, by the first server, the list of substitute goods to the customer using a method of communication requested by the customer, wherein the list of substitute goods comprises associated images of each good on the list of substitute goods;

waiting, by the first server, a predetermined time to receive from the customer, through the customer device, a first selection of a first substitute good from the list of substitute goods, wherein:
receiving a response from the customer regarding the list of substitute goods sent to the customer, by the first server, wherein the response from the customer either (a) selects the first substitute good from the list of substitute goods to replace the one good that is not available at the facility, or (b) deletes the one good of the at least one good that is not available at the facility from the customer order; and
after receiving the response from the customer, (a) when the customer selected the first substitute good to replace the one good that is not available at the facility, then the first server revises the customer order to include the first substitute good and delete the one good of the at least one good that is not available at the facility from the customer order, or (b) when the customer deleted the one good, then the first server revises the customer order to delete the one good of the at least one good from the customer order, when the first server does not receive the response from the customer within the predetermined time, receiving from the assembler device a selection of a second substitute good from the list of substitute goods to replace the one good that is not available at the facility to revise the customer order to include the second substitute good, wherein the assembler selects the second substitute good to replace the one good that is not available at the facility based on at least the pick-up time requested by the customer;

determining, by the second server, by communicating to (a) the first server and (b) the assembler device, the pick-up time at the facility, wherein the first server receives the motor vehicle license plate number of a vehicle confirmed by the customer to be used to pick up the customer order during the pick-up time, and wherein the first server provides the customer order and the motor vehicle license plate number of the vehicle confirmed by the customer to the second server, wherein the second server provides the customer order, as revised, to be assembled to the assembler device;

capturing, by the optical sensor, images of the motor vehicle license plate upon arrival at the facility, wherein the optical sensor communicates with the (a) second server and (b) the optical character recognition system;

verifying, by the optical character recognition system, that the images captured by the optical sensor match the motor vehicle license plate number for a positive identification of the vehicle; and the second server communicates with the assembler device to deliver an assembled order, based on the customer order, as revised, to the customer associated with the motor vehicle license plate number, as positively identified.

12. The method of claim 11, wherein:
the assembler device is configured to scan universal product codes of goods that are available at the facility; and
the list of substitute goods comprises at least a portion of the goods for which the universal product codes are scanned by the assembler device.

13. The method of claim 12, wherein:
the database comprises images of the goods available at the facility; and
the method further comprises:
providing, by the first server, the images of each of the goods in the list of substitute goods to a graphical user interface of the customer device; and the images of the goods in the list of substitute goods are based on the universal product codes, as scanned.

14. The method of claim 11, wherein:
the database comprises information associated with each of a plurality of customers in customer records associated with the each of the plurality of customers, the plurality of customers comprising the customer; and
the customer records for the each of the plurality of customers comprise indications of methods of communication requested by the each of the plurality of customers.

15. The method of claim 14, wherein the list of substitute goods is sent to the customer device via the first server using the method of communication, and wherein the list of substitute goods further comprises other information associated with the each good on the list of substitute goods.

16. The method of claim 15, wherein the method of communication is at least one of an automated telephone call, an email, an instant message, a multimedia message service message, or a message sent to a specific application on the customer device.

17. The method of claim 14, wherein a link to a website is sent to the customer device by the first server using the method of communication.

18. The method of claim 11, wherein:
displaying the list of the at least one good in the customer order is performed by multiple assembler devices, each of the multiple assembler devices being operable by a respective assembler and being configured to display the customer order to the respective assembler when the respective assembler is assembling the customer order, wherein the multiple assembler devices comprise the assembler device.

19. The method of claim 14, wherein the first substitute good of the list of substitute goods is stored in the customer record associated with the customer.

20. The method of claim 19, wherein the first substitute good on the list of substitute goods in a future list of substitute goods for the customer.

21. One or more non-transitory computer-readable storage medium storing one or more programs having computer-executable instructions embodied thereon, wherein when executed by at least one processor, the one or more programs and the computer-executable instructions cause the at least one processor to:

receiving, at an order fulfillment system located at a facility, a customer order placed by a customer through a customer device, the customer order including at least one good, and the order fulfillment system comprises a first server, a second server, an optical sensor, and an optical character recognition system, wherein the first server stores motor vehicle license plate numbers associated with the customer and prompts the customer to select a motor vehicle license plate number of motor vehicle license plates stored in the first server prior to a pick-up time of the customer order at the facility;

displaying, using an assembler device being configured to communicate with the first server of the order fulfillment system when one good of the at least one good of the customer order is not available at the facility, the assembler device being configured to perform (a) displaying a list of the at least one good in the customer order and (b) receiving a list of substitute goods for the one good;

storing information related to customer orders in a database and the order fulfillment system, wherein the customer order is received at the first server from the customer through the customer device coupled to the first server;

sending, by the first server, the list of substitute goods to the customer using a method of communication requested by the customer, wherein the list of substitute goods comprises associated images of each good on the list of substitute goods; and waiting, by the first server, a predetermined time to receive from the customer, through the customer device, a first selection of a first substitute good from the list of substitute goods, wherein:

receiving a response from the customer regarding the list of substitute goods sent to the customer, by the first server, wherein the response from the customer either (a) selects the first substitute good from the list of substitute goods to replace the one good that is not available at the facility, or (b) deletes the one good of the at least one good that is not available at the facility from the customer order;

after receiving the response from the customer, (a) when the customer selected the first substitute good to replace the one good that is not available at the facility, then the first server revises the customer order to include the first substitute good and delete the one good of the at least one good that is not available at the facility from the customer order, or (b) when the customer deleted the one good, then the first server revises the customer order to delete the one good of the at least one good from the customer order, when the first server does not receive the response from the customer within the predetermined time, receiving from the assembler device a selection of a second substitute good from the list of substitute goods to replace the one good that is not available at the facility to revise the customer order to include the second substitute good to replace the one good that is not available at the facility, wherein an assembler selects the second substitute good to replace the one good that is not available at the facility based on at least the pick-up time requested by the customer;

determining, by the second server, by communicating to (a) the first server and (b) the assembler device, the pick-up time at the facility, wherein the first server receives the motor vehicle license plate number of a vehicle confirmed by the customer to be used to pick up the customer order during the pick-up time, and wherein the first server provides the customer order and the motor vehicle license plate number of the vehicle confirmed by the customer to the second server, wherein the second server provides the customer order, as revised, to be assembled to the assembler device;

capturing, by the optical sensor, images of the motor vehicle license plate upon arrival at the facility, wherein the optical sensor communicates with the (a) second server and (b) the optical character recognition system;

verifying, by the optical character recognition system, that the images captured by the optical sensor match the motor vehicle license plate number for a positive identification of the vehicle; and the second server communicates with the assembler device to deliver an assembled order, based on the customer order, as revised, to the customer associated with the motor vehicle license plate number, as positively identified.

22. The one or more non-transitory computer-readable storage media of claim 21, wherein:

the assembler device is configured to scan universal product codes of goods that are available at the facility; and the list of substitute goods comprises at least a portion of the goods for which the universal product codes are scanned by the assembler device.

23. The one or more non-transitory computer-readable storage media of claim 22, wherein:

the database comprises images of the goods available at the facility;

the first server is configured to provide the images of each of the goods in the list of substitute goods to a graphical user interface of the customer device; and the images of the goods in the list of substitute goods are based on the universal product codes, as scanned.

24. The one or more non-transitory computer-readable storage media of claim 21, wherein:

the database comprises information associated with each of a plurality of customers in customer records associated with the each of the plurality of customers, the plurality of customers comprising the customer; and the customer record for the each of the plurality of customers comprise indications of methods of communication requested by the each of the plurality of customers.

25. The one or more non-transitory computer-readable storage media of claim 24, wherein the list of substitute goods is sent to the customer device via the first server using the method of communication, and wherein the list of substitute goods further comprises other information associated with the each good on the list of substitute goods.

26. The one or more non-transitory computer-readable storage media of claim 25, wherein the method of communication is at least one of an automated telephone call, an email, an instant message, a multimedia message service message, or a message sent to a specific application on the customer device.

27. The one or more non-transitory computer-readable storage media of claim 21, wherein:

displaying the list of the at least one good in the customer order is performed by multiple assembler devices, each of the multiple assembler devices being operable by a respective assembler and being configured to display the customer order to the respective assembler when the respective assembler is assembling the customer order, wherein the multiple assembler devices comprise the assembler device.

* * * * *